Patented May 30, 1950

2,509,201

UNITED STATES PATENT OFFICE 2,509,201

S-CARBOXYALKYLENE ISOTHIURONIUM SALTS OF ANTIMONYL TARTRATE

Edmond E. Moore, Waukegan, and Le Roy W. Clemence, Highland Park, Ill., assignors to Abbott Laboratories, North Chicago, Ill., a corporation of Illinois No Drawing. Application August 22, 1947, Serial No. 770,182

11 Claims. (Cl. 260—446)

The invention relates in general to salts of antimonyl tartrate and more specifically to aliphatic base salts of antimonyl tartrate. The preferred compounds of the invention are carboxyalkylisothiuronium salts which may be illustrated by the following general formula:

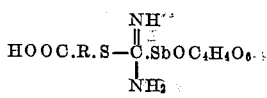

wherein R' is an alkyl (aliphatic hydrocarbon) group containing from one to ten carbon atoms.

We have discovered that the compounds of the invention are active chemotherapeutic agents. They are of particular value in the treatment of certain tropical parasitic diseases; e. g. in the treatment of schistosomiasis.

We have also discovered that the compounds of the invention are soluble in water. This is of great practical importance as it makes it possible to inject the compounds in an aqueous medium into the muscle for the treatment of a particular disease.

As a general process for the preparation of these compounds, two moles of the aliphatic base or substituted isothiourea are reacted with one mole of sulfuric acid and one mole of barium antimonyl tartrate. The sulfate of the base formed and the barium antimonyl tartrate readily undergo double decomposition so that the insoluble barium sulfate is precipitated from the solution. After removal of the barium sulfate precipitate by a suitable means such as filtration, the desired product may be isolated by evaporating the aqueous solution to dryness, taking up the residue in a small amount of distilled water and precipitating by the addition of alcohol. Instead of using the barium antimonyl tartrate, other alkaline earth metal salts such as the calcium or strontium salts may be used. In fact, any combination may be used, in which the acid of any stable acid addition product will form a water insoluble product with the cation of a salt of antimonyl tartrate. For example, the oxalate salt may be used with the calcium antimonyl tartrate by which insoluble calcium oxalate will precipitate from the aqueous solution. Thus the basic idea of the process of the invention is that the acid of the acid addition product must be insoluble with the cation of the antimonyl tartrate salt.

The antimonyl tartrate salt used in the preparation of the novel compounds of the invention may be prepared by the general method disclosed in the book by Christiansen entitled, "Organic Derivatives of Antimony," page 190. This process involves reacting two moles of potassium antimonyl tartrate with one mole of barium chloride. The product obtained usually has 3 molecules of water of hydration.

The examples which follow will specify the more precise details of the process for the preparation of these compounds.

EXAMPLE I

S-α-carboxymethylisothiuronium antimonyl tartrate

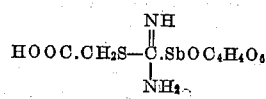

About 4.02 gms. (0.030 mole) of S-α-carboxymethylisothiourea is suspended in 150 ml. of water and cooled on an ice bath. To this is added 8.11 ml. of a cold solution of 1:10 sulfuric acid (0.015 mole). After stirring for five minutes the solution is allowed to reach room temperature. If necessary to effect a clear solution, the solution may be warmed slightly. About 11.45 gms. (0.015 mole) of barium antimonyl tartrate is added to the above solution and the mixture shaken vigorously for about fifteen minutes in a closed container. The resulting yellow solution is filtered and then centrifuged to remove all of the precipitate. The filtrate is evaporated under vacuum at a temperature of about 50° C. The white solid obtained is broken up and washed with benzene, redried under vacuum and washed with absolute ethyl alcohol. Upon redrying the final product is a pale yellow solid. Analysis indicates an antimony content of 28.65%. The calculated percentage is 28.90% antimony.

EXAMPLE II

S-β-carboxyethylisothiuronium antimonyl tartrate

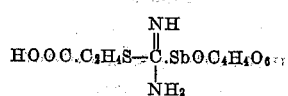

About 4.44 gms. (0.03 mole) of S-β-carboxyethylisothiourea is suspended in 100 ml. of water and cooled on an ice bath. To this suspension is added 8.11 ml. (0.015 mole) of a 1:10 sulfuric acid solution prepared by dissolving 10 ml. of concentrated sulfuric acid and diluting with water to a volume of 100 ml. A clear solution results. About 11.44 gms. (0.015 mole) of barium antimonyl tartrate is added, and the resulting suspension is stirred and then shaken. The filtrate is centrifuged and then evaporated under vacuum in a vacuum drier at 50° C. resulting in a gummy mass. This mass is triturated with absolute ethyl alcohol containing 5% benzene and the alcohol decanted. This trituration and decanting is repeated and the product dried again as above. Upon drying, the powder analyzes to inicate a content of 27.46% antimony. The calculated antimony percentage for the compound is 28.1%.

EXAMPLE III

*S-δ-carboxy-n-butylisothiuronium antimonyl tartrate*

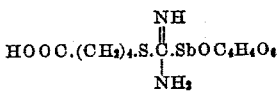

By carrying out the process as described in Example I or II and using a ratio of two moles of S-delta-carboxy-n-butylisothiourea for one mole of sulfuric acid and one mole of barium antimonyl tartrate, the above compound is obtained. Analyses of the compound indicates an antimony content of 26.8%. The calculated percentage is 26.36% antimony.

EXAMPLE IV

*S-ε-carboxy-n-amylisothiuronium antimonyl tartrate*

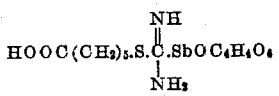

Using the procedure disclosed in Example I or II and using a ratio of two moles of S-ε-carboxy-n-amylisothiourea for one mole of sulfuric acid and one mole of barium antimonyl tartrate, the above compound is obtained. The antimony content is found to be 25.57%. The calculated antimony content is 25.59%.

EXAMPLE V

*S - ε - carboxy-n-(γ-methyl)-amylisothiuronium antimonyl tartrate*

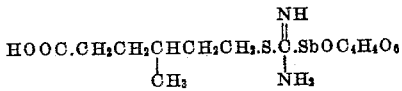

By duplicating the procedure of Example I or II and by using a ratio of two moles of S-ε-carboxy-n-(γ-methyl)-amylisothiourea for one mole of sulfuric acid and one mole of barium antimonyl tartrate, the resulting product is the compound described above. The compound is found to have an antimony content of 25.3%. The calculated percentage of antimony is 24.85%.

EXAMPLE VI

*S-κ-carboxy-n-decylisothiuronium antimonyl tartrate*

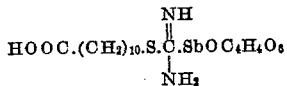

By replacing the substituted thiourea in the foregoing examples with S-κ-carboxy-n-decylisothiourea, the above compound is obtained.

EXAMPLE VII

*Methylglucamine antimonyl tartrate*

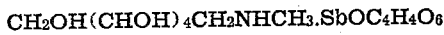

About 5.85 gms. (0.03 mole) of methylglucamine is dissolved in 150 ml. of water and the solution cooled in an ice bath. About 8.33 cc. (0.015 mole) of a 1:10 solution of sulfuric acid is added while the solution is being stirred. 11.44 gms. (0.15 mole) of barium antimonyl tartrate is next added and the mixture shaken for about 16 hours. The resulting suspension is filtrated and centrifuged to remove the barium sulfate from the solution. The filtrate is evaporated under vacuum at 50° C. The resulting oil is washed with absolute ethyl alcohol several times and with dry benzene once and redried under vacuum. A fine white powder results. This powder is found to have a content of 25.87% antimony. The calculated content is 25.32% antimony.

The substituted isothioureas used as intermediates may be prepared by processes described in the literature as follows: S-α-carboxymethylisothiourea; Journal American Chemical Society 63, 3531 (1941); and the publication of Moore et al., ibid., 69, 266 (1947).

The compounds of the present invention may be incorporated into a number of suitable pharmaceutical vehicles. Since these compounds are water soluble they are most effectively prepared for intramuscular injection by dispensing the product as an aqueous solution. Concentrations up to 10% have been found to be satisfactory.

The term "mole" is intended to refer to "gram molecular weight."

Others may readily adapt the invention for use under various conditions of service, by employing one or more of the novel features disclosed, or equivalents thereof. As at present advised with respect to the apparent scope of our invention, we desire to claim the following subject matter.

We claim:

1. S-carboxyalkylene isothiuronium salts of antimonyl tartrate.

2. Isothiuronium salts of antimonyl tartrate with the following formula:

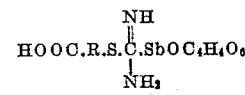

wherein R is an alkylene group containing from one to ten carbon atoms.

3. The compound S-α-carboxymethylisothiuronium antimonyl tartrate with the following formula:

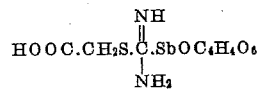

4. The compound S-β-carboxyethylisothiuronium antimonyl tartrate with the following structure:

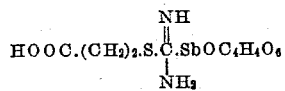

5. The compound S-ε-carboxyamylisothiuronium antimonyl tartrate with the following structure:

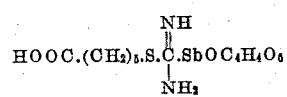

6. The process of preparing organic carboxyalkylisothiuronium salts of antimonyl tartrate which comprises: reacting a carboxyalkylisothiuronium-acid addition product with a metal salt of antimonyl tartrate; said acid and said metal being of such a nature that they will form an insoluble precipitate with each other in water.

7. The process of preparing carboxyalkylisothiuronium salts of antimonyl tartrate, which comprises: reacting a carboxyalkylisothiourea sulfate with barium antimonyl tartrate.

8. The process of preparing carboxyalkylisothiuronium salts of antimonyl tartrate, which comprises: reacting a carboxyalkylisothiourea with sulfuric acid and reacting the resulting isothiuronium sulfate with barium antimonyl tartrate.

9. The process of preparing carboxyalkylisothiuronium salts of antimonyl tartrate, which comprises: reacting two moles of a carboxyalkylisothiourea with one mole of sulfuric acid and reacting the resulting isothiuronium sulfate with one mole of barium antimonyl tartrate.

10. The compound S-δ-carboxy-n-butylisothiuronium antimonyl tartrate with the following formula:

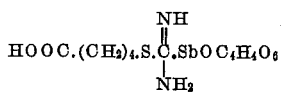

11. The compound S-ε-carboxy-n-(γ-methyl)-amylisothiuronium antimonyl tartrate with the following formula:

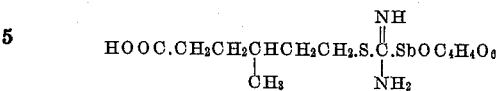

EDMOND E. MOORE.
LE ROY W. CLEMENCE.

REFERENCES CITED

The following references are of record in the file of this patent:

UNITED STATES PATENTS

| Number | Name | Date |
| --- | --- | --- |
| 2,118,769 | Shonle | May 24, 1938 |

OTHER REFERENCES

"Chemical Abstracts," vol. 16 (1922), page 611, abstract of original by Brahmachari.